United States Patent [19]
Richard

[11] 3,981,390
[45] Sept. 21, 1976

[54] CONVEYING BELT
[75] Inventor: Byron G. Richard, Denver, Colo.
[73] Assignee: The Gates Rubber Company, Denver, Colo.
[22] Filed: Sept. 25, 1975
[21] Appl. No.: 616,740

[52] U.S. Cl. ................................ 198/844; 198/627
[51] Int. Cl.² .......................................... B65G 15/42
[58] Field of Search .......... 198/151, 176, 198, 200, 198/DIG. 18, 16 R; 74/231 R

[56] References Cited
UNITED STATES PATENTS

| | | | |
|---|---|---|---|
| 2,276,978 | 3/1942 | Hyman et al. | 198/176 |
| 2,981,397 | 4/1961 | Hansen | 198/16 |
| 3,147,850 | 9/1964 | Ronceray | 198/176 X |

Primary Examiner—Evon C. Blunk
Assistant Examiner—Douglas D. Watts
Attorney, Agent, or Firm—H. W. Oberg, Jr.; Raymond Fink; Curtis H. Castleman, Jr.

[57] ABSTRACT

A belt with at least one groove in its top and an attached working element with a foot portion having at least one rib that is disposed at least partially in the groove. A single fastener attaches the foot portion to the belt.

7 Claims, 4 Drawing Figures

CONVEYING BELT

BACKGROUND OF THE INVENTION

The invention relates to harvesters, but more particularly, the invention relates to a conveying belt with at least one working element attached exteriorly thereto.

In harvesting equipment, it is sometimes advantageous to use belts for performing work in addition to or other than their normal function of power transmission. One or more working elements may be attached at the belt exterior as shown in U.S. Pat. Nos. 3,545,188 and 3,831,358. These patents disclose various means for attaching different cutters or working elements to belts. While such attachments are satisfactory for high speed cutting where the cutters are stabilized by guide bars, or centrifugal or gyroscopic forces, such attachments have not proven satisfactory for low speed cutting belts with larger working elements. The high speed cutting belts have an attachment point which allows the working element to be twisted on the top exterior surface of the belt. Obviously, such twisting reduces the conveying ability of the system.

For slow speed type belts, the working element is typically larger which, because of an increased moment arm, makes it easily deflectable. An example of an integrally molded working element in the form of a lug is shown in U.S. Pat. No. 2,637,436. Working elements in this type of belt are not replaceable. While the integrally molded system is perhaps good for some conveying systems it also has problems. The belt bends chordally around pulleys which highly stresses the working element and belt at the point of attachment. Cracks appear at the base of the working element which may cause the lug to be eventually pulled off. The lug is then irreplaceable. Such problems lead to the development of a new class of belts where the working element is attached by means of two longitudinally spaced fasteners.

In some of these belts, a solid molded working element is attached with longitudinally spaced fasteners. Others use metal or plastic straps bent to a V-shape with the apex of the V oriented away from the top of the belt and the two sides of the V bent to form a small tab that is attached to the belt with longitudinally spaced fasteners. The theory of the strap type element is that it will reduce chordal bending of the belt as it operates around sheaves by permitting portions of the V-shape strap to bend. While the effects of chordal bending may be reduced to such a device, a problem of flex fatigue of the strap material is introduced which leads to early failure of the working element.

SUMMARY OF THE INVENTION

In accordance with the invention, conveying apparatus is provided that includes a belt with at least one working element attached to the top thereof. The belt has at least one longitudinally oriented groove into which is positioned a rib that extends from a foot portion of a working element. A single fastener extends through the belt and a portion of the foot. The groove, rib, and fastener coact with each other to resist the foot from pivoting around the fastener.

An object of the inventin is to provide a connection between a belt and a working element which minimizes chordal bending of the belt around sheaves.

An advantage of the invention is that a single fastener may be used to attach the working element securely to the belt without the problem of element failure and twisting.

Another object of the invention is to provide visual means for determining intactness of the belt assembly during operation.

These and other objects or advantages of the invention will be more apparent after reviewing the drawings and description thereof wherein.

DESCRIPTION OF A PREFERRED EMBODIMENT

Figure 1:
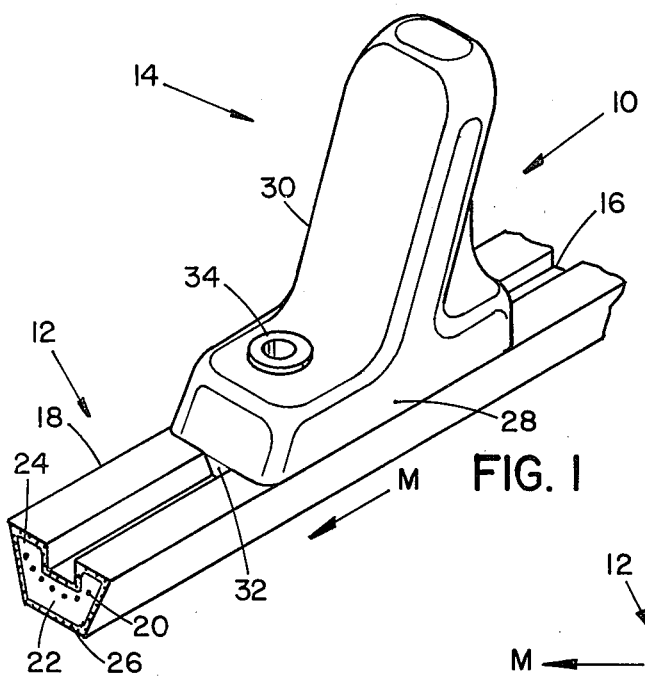
FIG. 1 is a partial isometric view showing a conveying belt of the invention.
Figure 2:
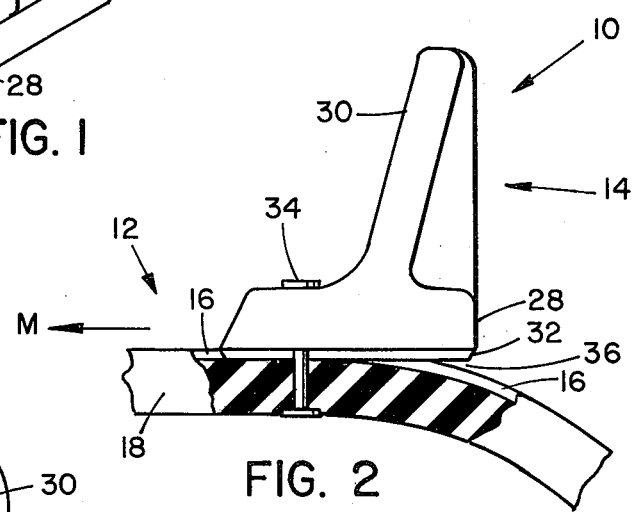
FIG. 2 is a side view of the apparatus of the invention partially cutaway showing a portion of a belt bent as if around a sheave.

FIGS. 1 and 2 disclose conveying apparatus 10 that includes a belt 12 with at least one working or conveying element 14 attached at the top exterior surface of the belt. The manner of spacing more than one element is shown in the above referenced U.S. patents. To this end, these patents are incorporated by reference. At least one longitudinal groove 16 is formed in the top of the belt. Preferably, the groove is formed by molding but it may be formed by other means such as cutting or grinding. Belts with grooves or ribs are exemplified by U.S. Pat. Nos. 2,548,135 and 3,404,577. In these belts, the ribs are for enhancing belt stability with a backside idler.

The belt is constructed of known materials using known constructions and fabricating techniques. The belt may be in the form of belting that is attached together as exemplified in U.S. Pat. No. 1,923,542; the flat type; positive drive type; or preferably, of the V-type 18. The preferable belt includes a tensile section 20, an undercord 22, and an overcord 24. The belt may optionally be wrapped with a cover 26. Belts without a cover are known as "cut-edge" belts whereas belts with a cover are known as "covered" belts.

A working element 14 is used which has a foot portion 28 and a working portion 30. The working portion is chosen to accomplish a desired task. For example, the working portion may be in the form of fingers, hooks, rods, or the like to convey items such as cut foliage in harvesting equipment.

The foot portion 28 has a contour which complements the top surface of the belt. Usually, the belt top is generally flat or slightly convex. A rib 32 longitudinally projects from at least a portion of the foot. The rib 32 is dimensioned to be insertable in the belt groove 16. A snug fit is desirable although a loose fit is tolerable.

A single fastener 34 extends through the belt and a portion of the foot. The fastener may be of any known type such as a nut and bolt, or preferably, a rivet. The fastener snugly positions the foot against the top of the belt. During fastening, the belt may be slightly compressed to enhance its retention capability and prevent slop. Over-compression of the belt should be avoided as it causes an undesirable side bulge in the belt. It is preferred that the working element be attached at the leading edge of the foot toward the direction of belt movement M. Induced loads at the working portion 30 then tend to self-align the working element.

Preferably, the working element 14 is made of a material having a higher modulus than that of the belt. Optionally, at least the rib and foot portion of the working element have the higher modulus. When slow speed conveyors are used, it is desirable that the working element be brightly colored or light emitting or light reflective. This aids an operator in determining the integrity of the conveying system during operation.

In use, a belt assembly is positioned around at least two aligned sheaves where one of the sheaves is powered for rotation. Typically, two belts are used and are aligned to be oppositely facing each other as shown in U.S. Pat. No. 2,637,436. The working elements engage the material and convey it with the belt in an endless fashion.

As the working portion encounters objects such as cut foliage, torques are applied which are reacted at the fastener, top of the belt, and rib/groove combination. Should one or more working elements become dislodged, it may be easily replaced in the field by repositioning a new element and fastening it into position. Lateral torques at the working portion are reacted by the rib and slot to preclude the foot from pivoting around the fastener. The rib and groove are in full engagement with each other during the conveying operation but may become slightly separated as the belt is bent around the sheave. Since only one fastener is used, chordal bending of the belt is minimized. As the belt bends around the sheave, a portion of the foot stays in its position while the belt bends away 36. This gives the belt maximum flexibility for good life while simultaneously minimizing bending stresses. The attachment mechanism also performs an economic advantage by minimizing the number of fasteners required for attaching the working element to the belt.

ADDITIONAL SPECIES

Figure 3:
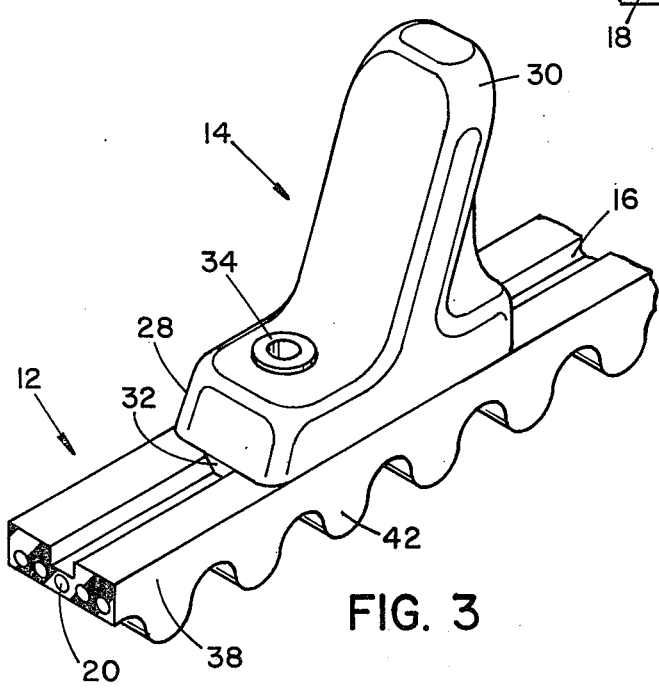
FIG. 3 is a partial isometric view showing an alternate form of the invention.
Figure 4:
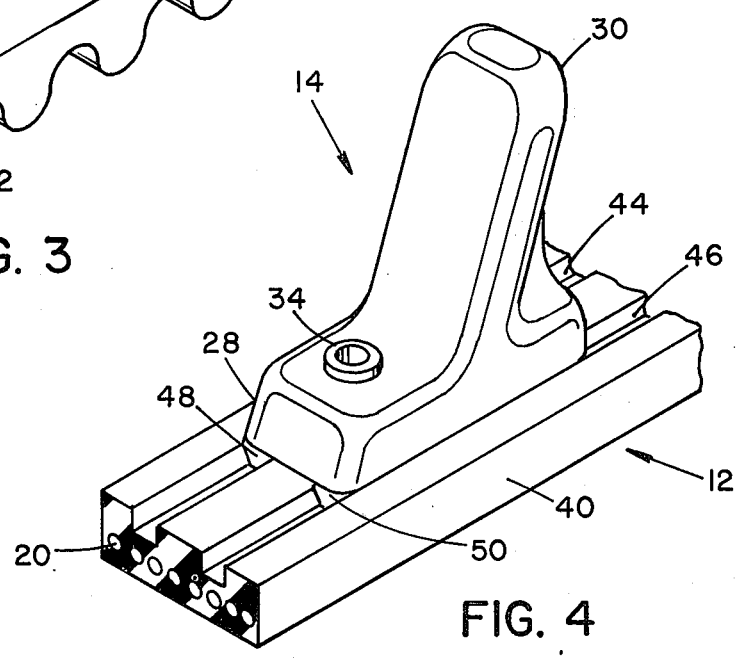
FIG. 4 is a partial isometric view showing an alternate form of the invention.

While the foregoing description is directed to a V-type belt, the attachment system will also work with other types of belts such as a positive drive belt 38 or a flat belt 40 as shown in FIGS. 3 and 4. The working element may be attached in a manner as previously described. When using a positive drive belt, the fastening portion preferably extends through a tooth 42 of the belt for maximum holding power and minimum interference with a toothed pulley. Optionally, two or more belt grooves 44, 46, may be used with two or more ribs 48, 50 as exemplified in FIG. 4.

The foregoing description is presented for purpose of illustration only and is not intended to limit the scope of the invention which is to be determined from the appended claims.

What is claimed is:

1. Conveying apparatus comprising:
   a belt having a substantially flat top surface with at least one groove therein oriented longitudinally of the belt and generally perpendicular to a transverse horizontal axis of the belt; and extending from said substantially flat top surface to a position below said substantially flat top surface.
   at least one working element with a foot portion with at least one rib and a leading portion, the foot portion disposed against the top of the belt with the rib disposed in the groove;
   a fastener extending through a portion of the belt and only the leading portion of the foot portion in a direction generally normal to the groove;
   whereby the fastener, rib, and groove in the belt substantially (1) preclude the foot portion from pivoting at the top surface of the belt; and (2) do not inhibit belt bending.

2. The apparatus of claim 1 wherein the belt is a positive drive belt.

3. The apparatus of claim 1 wherein the belt is a V-belt.

4. The apparatus of claim 1 wherein the groove is integrally molded in the belt.

5. The belt of claim 1 wherein the rib of the working element runs substantially throughout the length of the shoe.

6. The apparatus of claim 1 wherein the bending modulus of the working element is greater than the modulus of the belt.

7. The apparatus of claim 1 wherein at least a portion of the working element is brightly colored.

* * * * *